Dec. 10, 1968 D. C. DICKSON, JR., ET AL 3,416,046

ENCASED ZENER DIODE ASSEMBLY AND METHOD OF PRODUCING SAME

Filed Dec. 13, 1965 2 Sheets-Sheet 1

INVENTOR.
DONALD C. DICKSON JR.
DALTON L. KNAUSS

BY John J. McLaughlin

ATTORNEY

Dec. 10, 1968 D. C. DICKSON, JR., ET AL 3,416,046

ENCASED ZENER DIODE ASSEMBLY AND METHOD OF PRODUCING SAME

Filed Dec. 13, 1965 2 Sheets-Sheet 2

INVENTOR.
DONALD C. DICKSON, JR.
DALTON L. KNAUSS
BY John J. McLaughlin
ATTORNEY United States Patent Office — 3,416,046 — Patented Dec. 10, 1968

3,416,046
ENCASED ZENER DIODE ASSEMBLY AND METHOD OF PRODUCING SAME

Donald C. Dickson, Jr., and Dalton L. Knauss, Scottsdale, Ariz., assignors to Dickson Electronics Corporation, a corporation of Arizona Continuation-in-part of application Ser. No. 197,628, May 25, 1962. This application Dec. 13, 1965, Ser. No. 517,880
3 Claims. (Cl. 317—234)

ABSTRACT OF THE DISCLOSURE

An encapsulated Zener diode structure incorporating a plurality of Zener diodes temperature compensated by direct contact with forward biased diodes; the diodes are encapsulated in an imperforate shell of high dielectric plastic material including an epoxy resin containing a proportion of pyromallitic dianhydride and finely divided silica.

Our invention is a continuation-in-part of our prior co-pending application Ser. No. 197,628, filed May 25, 1962, now abandoned. It relates to the production of improved temperature compensated Zener diode assemblies, and more particularly to the provision of improved encapsulating techniques for such assemblies.

Several types of voltages regulator circuits have been known for many years, such as circuits using gas-filled space discharge tubes which start conducting current at a particular voltage and will continue to conduct varying amounts of current while the voltage remains relatively unchanged. As more sophisticated circuits developed, greater and greater stability of the regulated voltage was required. A reverse-biased semiconductor diode has shown many advantages over prior devices because its breakdown voltage when reverse-biased remains constant even though the load current may vary. This breakdown or regulating voltage is commonly called Zener voltage, and a semiconductor diode designed to be used as a voltage regulator is commonly called a Zener diode.

Notwithstanding the ability to improve voltage regulating circuitry by the use of Zener diodes, the precise control of voltage was possible only when the temperature was maintained constant. It has been known for some time, however, that by connecting properly selected forward biased diodes in series with the Zener diode, temperature compensation over a range of temperatures became possible. For the manufacturer of electronic circuits and equipment to employ the principle of effecting temperature compensation by the use of selected forward biased diodes required him to maintain larger selection of diodes with varying characteristics. Single diodes with varying Zener voltages have been offered to the industry for several years, and this fact further complicated the problem. Since the component manufacturers had available a greater supply of temperature compensating diodes for use with a Zener diode to provide a desired reference or regulated voltage, the practice of offering to the electronics manufacturers a package unit for voltage control developed. Silicon diodes of the type used are very small, illustratively, less than 0.10 inch in diameter and not more than about .007 mil thick. Commonly, they are glass enclosed, with soldered leads extending through glass seals at opposite ends of the glass housing. One common practice, if one Zener diode and two forward biased diodes were employed, was to provide a small diameter metal mount with three openings therethrough. A diode was supported in each opening, and wire leads were soldered from the bottom of one diode to top of another to connect the three diodes in series. Two master leads were provided, and the assembly was sealed in glass with the master leads protruding therefrom. These units were supplied as such, and two or more of them could be included in a circuit. A practice also developed of welding the master leads together to form an assembly in which the glass bodies were spaced from each other. It was sometimes the practice to encase this entire assembly in plastic to produce a single voltage regulating unit.

The principal object of our invention is the provision of improved techniques for producing encased temperature compensated Zener diode assemblies.

Another object is the production of a small size encased temperature compensated Zener diode which may be made available to the industry in a wide selection of voltages, ranging upwardly to two hundred volts and higher.

Still another object is the provision of a series of temperature compensated Zener diode assemblies of very high reliability at relatively low cost.

Other further and more specific objects and advantages of the invention will be apparent from the following description taken in conjunction with the accompanying drawings, wherein.

Although the method of the present invention may be generally applicable to the production of a wide variety of semiconductor assemblies in which an assembly of semiconductor elements varies in size and may be very small and fragile, the unusual features and advantages embodied in the method are particularly significant when used to produce an improved temperature compensated Zener diode assembly, but it will be understood that the same techniques may be applied to the production of other semiconductor assemblies where the same types of problems are encountered.

Figure 1:
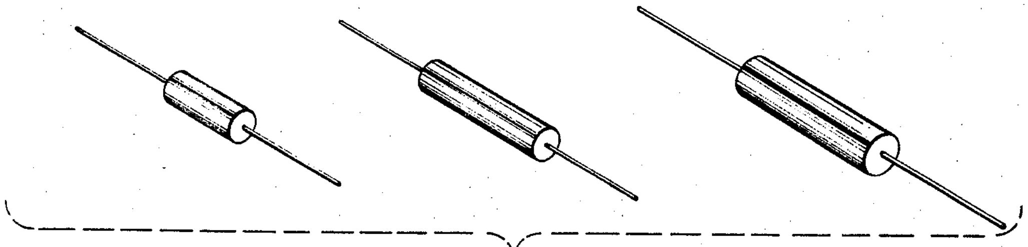
FIG. 1 is a composite view showing a plurality of packaged Zener diodes produced in accordance with our invention, the diodes shown representing members of a standard series differing from each other in their temperature compensated voltages.

Looking now first generally at FIG. 1, the method of the present invention makes possible the production of a complete series of temperature compensated Zener diode assemblies, each comprising at least one Zener diode and at least one, but usually at least two, temperature compensating forward biased diodes, with the series running, for example, from about nine Zener volts value to two hundred or more Zener volts, and characterized by uniform temperature coefficients and voltage tolerances. The temperature compensated Zener diode assemblies may be though of as made up of one or more modules, each module having one Zener diode and a sufficient number of forward conducting diodes to temperature compensate the Zener diode within the operating range of the module. The diodes in a given module are selected to have a predetermined value, and the overall assembly utilizes one or a plurality of such modules to produce a final assembly with the voltage characteristics desired. As will be pointed out, a commercially acceptable series of temperature compensated Zener diode assemblies may be produced, using only two modules for all except the lowest voltage assembly, but in general the number is apt to be in excess of two.

Figure 2:
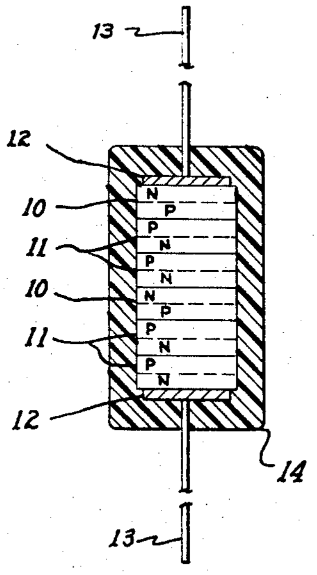
FIG. 2 is an enlarged sectional view showing the structure of one typical temperature compensated Zener diode assembly in a series.

FIG. 2 is a typical temperature compensated Zener diode for voltage control produced in accordance with the methods of the present invention. Two Zener diodes 10 are soldered to a pair of forward conducting diodes 11 to form a unitary stack of six diodes having a predetermined nominal voltage as will be explained. It will be noted that the diodes 10 and 11 are series connected but have opposite polarities. Terminal plates 12 (sometimes called nails or tacks to include their leads) are soldered to opposite ends of the stack comprising the diodes 10 and 11, and integral connecting but projecting terminal wires 13 are provided for connecting the assembly into a circuit. The method includes encapsulating the entire electrical assembly within a contacting integuement or shell 14 in the form of an imperforate layer of suitable resin or plastic. The shell 14 forms a firm mechanical support for the relatively long, narrow stack of dies forming the diode assembly and also functions as a dielectric. The shell 14 is suitable an epoxy resin with high mechanical strength, high dielectric, and high resistance to moisture. Further details of the procedures for forming the shell will be discussed hereinbelow.

Illustratively, the Zener diodes 10 of FIG. 2 may have a Zener voltage of 7.9 volts at room temperature and a temperature coefficient of +4 mv./° C. The forward biased diodes 11 may be selected to have a forward voltage drop of about 0.65 volt each and a temperature coefficient of −2 mv./° C. Thus, each module will have a total voltage drop of 9.2 volts, i.e. 7.9+0.65+0.65, or 18.4 for the entire diode assembly, as well as a zero temperature coefficient (+4 mv./° C., −2 mv./° C., −2 mv./° C.).

Figure 3:
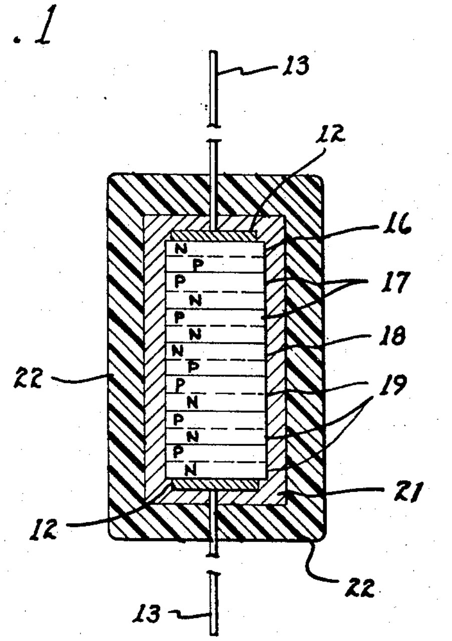
FIG. 3 is a sectional view produced in accordance with a modified method; it also represents another unit in a series in which the temperature compensated Zener voltage is higher than that of the assembly of FIG. 2.

In the temperature compensated Zener diode assembly shown in FIG. 3, a Zener diode 16 forms a temperature compensated module with a pair of forward conducting diodes 17. Illustratively, the Zener diode 16 and forward conducting diodes 17 are the same as the diodes 10 and 11 of FIG. 2, and the module comprising one Zener diode 16 and two forward biased diodes 17 will have a total regulating Zener voltage of about 9.2 volts. A temperature compensated Zener diode 18, however, has a Zener voltage of, for example, 9.7 and a temperature coefficient of +6 mv./° C. With this higher voltage Zener diode 18 are provided three forward conducting diodes 19, each with a forward voltage drop of .65 volt and a temperature coefficient of −2 mv./° C. Thus, the module comprising the diodes 18 and 19 has a total temperature compensated regulating voltage of about 11.65 volts (9.2+0.65+0.65+0.65)

The total Zener voltage for the stack of two Zener diode assemblies will then be 9.7+11.65 volts, or 21.35 volts.

The temperature compensated Zener diode assembly of FIG. 3 has the usual connectors 12 and 13. It has also an inner relatively thin shell 21 of hard high dielectric plastic material, and an outer supporting shell 22 of resin, plastic or the like. Further reference to characteristics and features of the shells 14, 21 and 22 will be made after further description of the electrical properties of the temperature compensated reference diode assemblies.

It has long been known that very small fragile groups of semiconductor devices—and this includes even single PN junction units with their integral leadout contacts—had to be protected carefully against mechanical stress, had to be packaged to reduce contamination to a bare minimum, particularly at a PN junction edge, and had to be supported to avoid contact with electrically undesirable material. In short, the housing or package, containing the semiconductor device had to have a housing tailored to fit it, so to speak. Thus, it will be noted that in the patent to Eisler, No. 2,737,611, covering a selenium rectifier, in which the base layer 1 carrying the crystallized selenium 2, the counter electrode 33 and contactor 4, illustratively .01 to .05 inch thick (this is the base plate 1 only) required a sleeve 7 of "nylon, Vinylite or spun glass" (illustratively, to hold the assembly in firm assembled relation). This sleeve 7 also was required to hold the leads 5 and 6 in position, and was part of the package whether a single selenium layer was used, as in FIG. 2, or two such layers, as in FIG. 5.

When the total number of diodes in a stack may vary, for example, from three to forty or more—not allowing for some slight variation in thickness from batch to batch—the problem of producing highly reliable temperature compensated Zener voltage assemblies ranging from, say, 9 volts to 250 volts begins to be apparent.

Applicants found that by the use of specific encapsulating techniques, and the fortuitous selection of encapsulating materials, they were able to support and insulate the stack without the use of a special housing, and produce an adequately physically rugged assembly with very great electrical reliability. Moreover, they were also able to produce relatively small component which would be adaptable for use with the most modern sophisticated circuits where both weight and volume are of great importance. They were able to produce their highly sophisticated temperature compensated Zener diode assemblies at relatively very low cost.

Figures 5, 6, 7, 8:
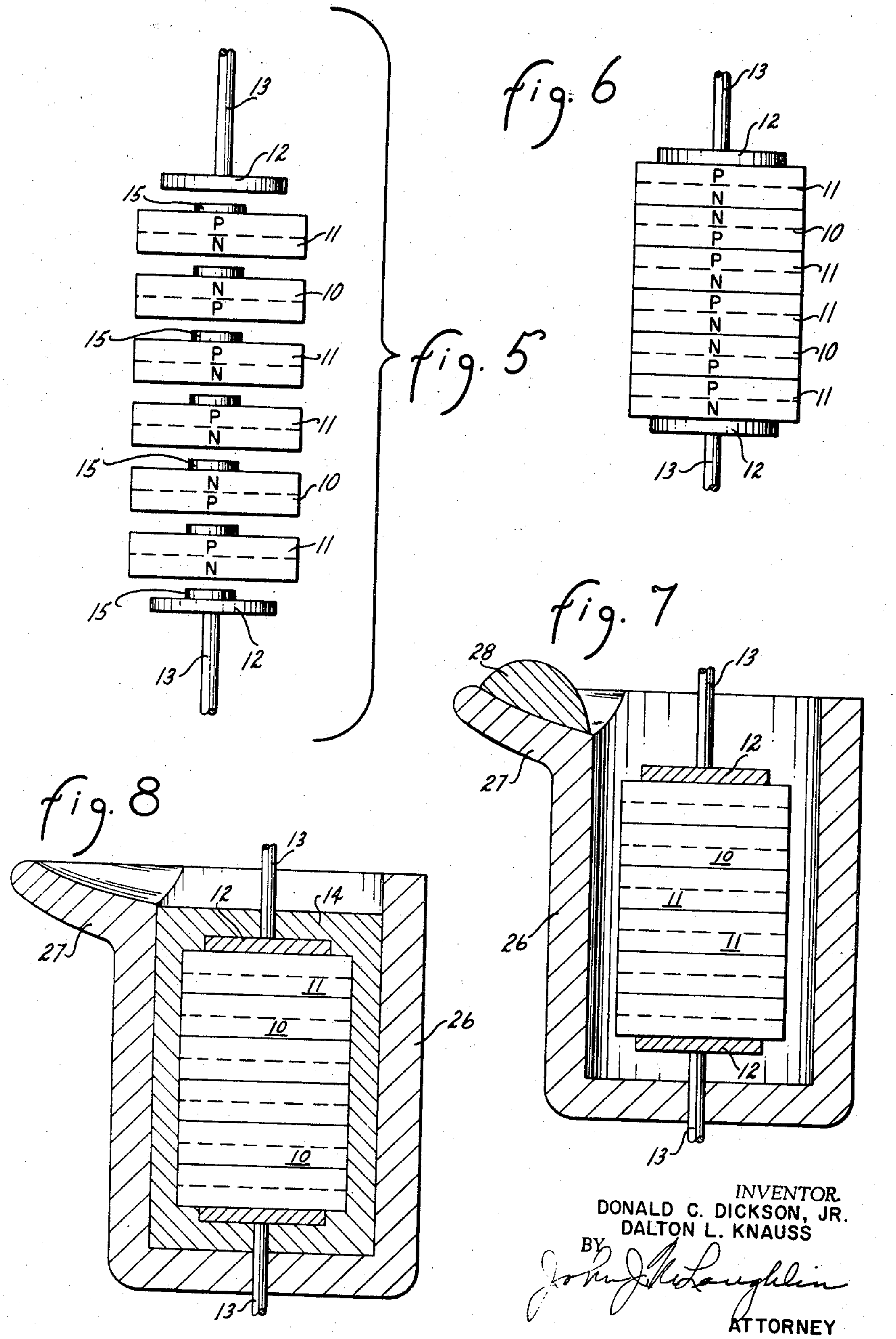
FIG. 5 shows a stack of diodes, terminal plates and terminal leads ready for soldering together in a suitable jig to produce a semiconductor stack preparatory to encapsulation.
FIG. 6 shows the stack in soldered condition.
FIG. 7 shows the stack in a special mold preparatory to encapsulation.
FIG. 8 shows a completed assembly with the encapsulating shell still in the mold.

In FIGS. 5 through 8, the method used is indicated somewhat more in detail but partly schematically as well. FIG. 5 illustrates in greatly enlarged form the "stack" shown in FIG. 2, with the parts in exploded relation, but otherwise ready for soldering together. It will be noted that the Zener diodes 10 are sandwiched between the forward biased diodes 11 so that they will be as nearly of the same temperature as possible during use. Temperature compensation is improved by this means. This is one reason for using in a stack a series of temperature compensated Zener modules, another being the convenience of assembly to produce a desired reference voltage value. It is obvious that individual modules may be soldered together first rather than soldering the entire stack at one time.

The stack in FIG. 5 includes all of the diodes, properly arranged, and the contact buttons or conectors 12 with the leads 13 in position as shown. Small pellets 15 of solder, preferably 95% Pb and 5% Sn are placed between all of the discs in the stack and the stack clamped in a jig (not shown) with the axes of all of the parts aligned. By baking the assembly in an atmosphere controlled oven held at a suitable temperature, e.g. 400° C., the stack is formed into a uniform self-sustaining body as shown in FIG. 6.

The unitary stack is then placed in an encapsulating mold 26 shown in FIGS. 7 and 8, with one lead 13 projecting through a bottom small opening and one lead projecting vertically upwardly. Suitable means (not shown) are provided to hold the stack spaced from the inside usrface of the mold so that the encapsulating material when introduced will form the shell 14 entirely surrounding the stack. A protruding lip at a top edge of the mold 26 is adapted to support a supply 28 of solid epoxy resin or the like sufficient in volume to form the shell. Alternate vacuum and pressure encapsulation may be accomplished by introducing the mold as prepared in FIG. 7 into a furnace in which a vacuum is drawn and a temperature produced high enough to melt the gobs of resin 28. When the furnace is then opened, ambient atmosphere pressure will force the molten resin around the stack and produce an imperforate void-free shell 14 as shown in FIG. 8. A thin coating or shell 21 may also be applied in this manner and an outer coating 22 then applied as shown in FIG. 3.

By means of the present invention, it is possible to deliver commercially a uniformly standardized series of temperature compensated Zener diode assemblies. Each unit of the series results from the series connection of the necessary modules, each consisting of the necessary members and types of PN junctions to yield the necessary predetermined voltage and temperature coefficient. Junction surfaces are treated for stability in accordance with usual practices, and the stack of diodes imbedded directly into an epoxy such as in the manner described. The finished product represents an unusual combination of performance, small size, stability, ruggedness and reliability.

Figure 4:
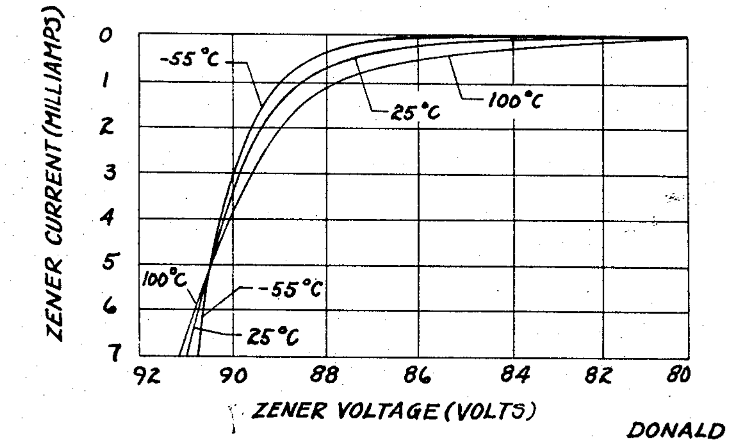
FIG. 4 shows three typical volt-ampere curves which may characterize a temperature compensated Zener diode assembly produced in accordance with the method of the present invention, with the temperature varying from −55° C. to 100° C.

FIG. 4 shows the remarkable uniformity in the relation between Zener current and Zener voltage which characterizes the temperature compensated Zener diode assemblies of the present invention. Between −55° C. and 100° C. there is little difference in the shape of the current-voltage curve.

In a series of reference diodes produced according to the present invention with Zener voltages running from 18.5 volts of 200 volts (and a voltage tolerance of 5%), a uniform maximum temperature coefficient of ±.005%° C. is readily obtained in a fully commercial, relatively low cost standard series of temperature compensated voltage reference diodes. Similar series may also be produced, at higher costs to be sure, in which the temperature coefficient may range down to ±0.001%/° C. or less, with voltage tolerances as low as ±1% or less, at test currents from 1 ma. to that value which is compatible with the power dissipating capability of the temperature compensated Zener diode assembly produced according to the present invention.

As previously made clear, the shell surrounding the stack of dies comprising the temperature compensated Zener diode assembly is directly in contact with the exterior surface of the diodes including the exposed junction edges. The material comprising the shell, in addition to furnishing adequate mechanical support for the relatively very small diameter stack of diodes under all usual conditions encountered in connection with their use, must have other properties and characteristics when employed in this way. Best results are obtained by forming the shell 14 (FIG. 2) of an epoxy resin containing thirty to sixty percent of finely divided silica making a total of one hundred parts into which is dispersed twenty-five to thirty-five parts of pyromellitic di-anhydride. The shell 14 formed of this mixture has very high shock and vibration resistance, moisture absorption is very low, and the dielectric strength high. Applied directly to a surface previously treated for stability, a mixture of epoxy resin and pyromellitic di-anhydride has remarkable surface passivating properties, a feature which is of general utility in the production of the temperature compensated Zener diode assemblies described hereinabove.

The encapsulating material employed should have high dielectric strength as well as high physical strength to resist bending or distortion such as might otherwise cause breakage to or otherwise adversely affect the relatively fragile "stack" which depends only on the encapsulating material for protection against mechanical forces involved throughout manufacture, test and use. Thus, it should resist shock and vibration tests without adversely affecting the "stack" or the seal of the leads 13 through the shell 14 (FIG. 2). The encapsulating material may be a thermo-setting or thermo-plastic material, but it should not require use of a temperature above about 275° C. Epoxy resin, for example, can be applied at about 175° C. Possible adverse effect of high temperature on the PN junction is thus avoided.

The provision of an encapsulating material comprising an epoxy resin having incorporated therein an effective amount of pyromellitic di-anhydride constitutes an important feature of the invention in that by its use very important and unexpected advantages are obtained. This composition provides an unusually and unexpectedly superior means of encapsulating stacks of various dimensions of temperature compensated Zener diode assemblies produced as described hereinabove, which means were not known or practiced in the semiconductor art prior to our invention. Additionally, the assembly of Zener diodes and temperature compensating forward conducting diodes produced as described as a single integrated article of manufacture of "component" is another important feature of the invention.

It is not essential that all of the properties desired in the shell be incorporated in one product. In FIG. 3, for example, a relatively thin shell 21 may be formed of an epoxy resin with about thirty percent of pyromellitic di-anhydride. This thin shell may comprise a very thin imperforate coating producing a sealing shell which passivates the exposed junction edges of the diodes, and adds to shock and vibration resistance. The shell 22 may then supply other desired properties such as increased dielectric strength, a firmer overall mechanical support for the diodes and controlled coefficient of expansion. In this way, only a relatively small amount of a relatively expensive material may be used to produce the thin shell, and a cheaper material to produce the outside shell. The provision of a firm mechanical support by means of a resinous or plastic shell structure is a significant advance when it is realized that the individual dies may have a diameter of 0.1 inch or less, and a thickness of the order of 5 to 10 mils, with the overall length of the stack varying from assembly to assembly.

Having described our invention and the presently preferred embodiments thereof, we claim:

1. A temperature compensated Zener diode assembly comprising:
(a) a plurality of Zener diodes,
(b) a plurality of forward biased diodes selected to compensate for temperature variation of the Zener diodes,
(c) said diodes soldered together in series to form a stack,
(d) each Zener diode being in close relation with forward biased diodes compensating to maintain substantial uniformity in the relation of Zener voltage and Zener current over a relatively wide range of temperature,
(e) a terminal plate on each end of the series of diodes, and said terminal plate and diodes forming a stack,
(f) terminal wires having an end connected to each such plate and opposite ends projecting in opposite directions at ends of the stack, and
(g) an imperforate shell of high dielectric hard plastic material surrounding said stack in direct contact therewith and forming a sole support therefor, said terminal wires extending through said shell, said plastic material being an epoxy resin containing a proportion of pyromellitic di-anhydride.

2. A temperature compensated Zener diode assembly comprising:
(a) a plurality of Zener diodes,
(b) a plurality of forward biased diodes selected to compensate for temperature variation of the Zener diodes,
(c) said diodes soldered together in series to form a stack,
(d) each Zener diode being in close relation with forward biased diodes compensating to maintain substantial uniformity in the relation of Zener voltage and Zener current over a relatively wide range of temperature,
(e) a terminal plate on each end of the series of diodes, and said terminal plate and diodes forming a stack, (f) terminal wires having an end connected to each such plate and opposite ends projecting in opposite directions at ends of the stack, and (g) an imperforate shell of high dielectric hard plastic material surrounding said stack in direct contact therewith and forming a sole support therefor, said terminal wires extending through said shell, said plastic material being an epoxy resin containing a proportion of pyromellitic di-anhydride and finely divided silica.

3. A temperature compensated Zener diode assembly comprising:

(a) a plurality of Zener diodes, (b) a plurality of forward biased diodes selected to compensate for temperature variation of the Zener diodes, (c) said diodes soldered together in series to form a stack, (d) each Zener diode being in close relation with forward biased diodes compensating to maintain substantial uniformity in the relation of Zener voltage and Zener current over a relatively wide range of temperature, (e) a terminal plate on each end of the series of diodes, and said terminal plate and diodes forming a stack, (f) terminal wires having an end connected to each such plate and opposite ends projecting in opposite directions at ends of the stack, and (g) an imperforate shell of high dielectric hard plastic material surrounding said stack in direct contact therewith and forming a sole support therefor, said terminal wires extending through said shell, said plastic material being an epoxy resin containing 30–60 parts of finely divided silica, and 25–35 parts of pyromellitic di-anhydride.

References Cited

UNITED STATES PATENTS

| | | | |
|---|---|---|---|
| 2,737,618 | 3/1956 | Eisler | 317—234 |
| 2,883,592 | 4/1959 | Burton et al. | 317—234 |
| 3,002,133 | 9/1961 | Maiden et al. | 317—234 |
| 3,016,580 | 1/1962 | Jaeschke | 18—59 |
| 3,156,861 | 11/1964 | Dickson | 323—66 |
| 3,274,454 | 9/1966 | Haberecht | 317—234 |
| 3,160,520 | 12/1964 | Jäntsch et al. | |
| 3,264,248 | 8/1966 | Lee. | |
| 3,332,912 | 7/1967 | Rochlitz et al. | |

JOHN W. HUCKERT, *Primary Examiner.*

J. R. SHEWMAKER, *Assistant Examiner.*